(No Model.)
I. W. HENRY.
ELECTRIC CONDUCTOR.
No. 584,936.  Patented June 22, 1897.
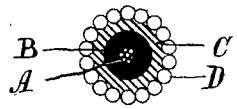
WITNESSES:
C. L. Belcher
G. H. Stockbridge
INVENTOR
Ira W. Henry
BY
Robert Head
his ATTORNEY

UNITED STATES PATENT OFFICE.

IRA W. HENRY, OF NEW YORK, N. Y.

ELECTRIC CONDUCTOR.

SPECIFICATION forming part of Letters Patent No. 584,936, dated June 22, 1897.

Application filed September 15, 1896. Serial No. 605,853. (No model.)

*To all whom it may concern:*

Be it known that I, IRA W. HENRY, a citizen of the United States, and a resident of New York, in the county and State of New York, have invented certain new and useful Improvements in Electric Conductors, of which the following is a specification.

This invention relates to armored conductors, the object being to avoid the inductive opposition to the flow of alternating or pulsatory currents which the iron armor commonly provided produces.

The invention is especially applicable to submarine conductors, which require a metallic armor to protect them from damage from shock or abrasion.

In carrying out my invention I inclose the conductor or group of conductors in a closely-adherent envelop of gutta-percha or other good waterproof insulating material and surround it with a plurality of spirally-wound wires of non-magnetic metal. I preferably use enough such wires to form a complete armor around the insulated conductor or group of conductors, entirely inclosing the same. As commonly constructed, the armor of submarine cables is made of iron or steel wire. I have ascertained that a conductor so made greatly lags and reduces the flow of current when alternating, pulsatory, or discontinuous currents are employed by reason of the good magnetic path afforded by the armor for the lines of force set up around the conductor by the current, which lines of force react on the conductor and generate a counter electromotive force. The difficulty is so pronounced that alternating currents have had but a limited scope of industrial application in submarine work. I avoid the difficulty by making the protective sheath or armor of a non-magnetic metal, thus greatly increasing the magnetic reluctance of the field around the conductor and thereby greatly weakening the opposition effect. I prefer to make the armor of aluminium bronze or silicon bronze by reason of their great tensile strength, but when cheapness is especially desirable copper may be employed with very good results. A group of wires of one of these materials is served side by side spirally around the conductor, so that the finished cable is flexible and may be stored or shipped on a reel and will conform to the inequalities of the supporting-surface without danger of injury from pressure or strain.

In the accompanying drawings, Figure 1 is a sectional view, and Fig. 2 an elevation, of a cable embodying my improvements.

A represents a group of conductors, which may be separately insulated or may be in contact accordingly as they are to be used in a common or in independent circuits. They are inclosed within a closely-adherent shell or envelop B, of gutta-percha or rubber, and are wrapped around with a considerable thickness of tarred jute C.

D represents the armor, formed of a number of independent wires of non-magnetic metal wound on a spiral of long pitch about the jute.

In using the cable the armor, may with convenience as well as advantage be used as a return-conductor, its mutual inductive relation to the inner conductor thus actually assisting the flow of current.

Having thus described my invention, what I claim as new, and desire to secure by Letters Patent, is—

A submarine conductor comprising a conducting-core inclosed within a sheath of waterproof insulating material capable of preserving its insulating properties at great depths in water, an inclosing sheath of fibrous material, and an armor composed of non-magnetic wires side by side.

In testimony whereof I have hereunto subscribed my name this 2d day of June, A. D. 1896.

IRA W. HENRY.

Witnesses:
ROBT. H. READ,
ALICK G. MACANDREW.